United States Patent
Jain et al.

(10) Patent No.: US 11,595,383 B2
(45) Date of Patent: Feb. 28, 2023

(54) PREAUTHORIZED DOMAIN JOIN

(71) Applicant: VMware, Inc., Palo Alto, CA (US)

(72) Inventors: Rupesh Jain, Atlanta, GA (US); Vijay Chari Narayan, Johns Creek, GA (US); Kishore Krishnakumar, Atlanta, GA (US); Ameya Jambavalikar, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 93 days.

(21) Appl. No.: 16/894,390

(22) Filed: Jun. 5, 2020

(65) Prior Publication Data
US 2021/0385214 A1    Dec. 9, 2021

(51) Int. Cl.
*H04L 67/1097* (2022.01)
*H04L 61/4523* (2022.01)
*H04L 9/40* (2022.01)
*H04L 9/32* (2006.01)

(52) U.S. Cl.
CPC ........ *H04L 63/0876* (2013.01); *H04L 9/3213* (2013.01); *H04L 61/4523* (2022.05); *H04L 63/102* (2013.01); *H04L 67/1097* (2013.01)

(58) Field of Classification Search
CPC .............. H04L 63/0876; H04L 9/3213; H04L 61/1523; H04L 63/102; H04L 67/1097
See application file for complete search history.

(56) References Cited

U.S. PATENT DOCUMENTS

| | | | |
|---|---|---|---|
| 9,130,910 B1* | 9/2015 | Logue | H04L 63/0823 |
| 2015/0220561 A1* | 8/2015 | Goetz | G06F 16/182 |
| | | | 707/827 |
| 2016/0323112 A1* | 11/2016 | Chung | H04L 63/061 |
| 2018/0041467 A1* | 2/2018 | Vats | H04L 9/0891 |
| 2018/0359238 A1* | 12/2018 | Appiah | H04L 63/0853 |
| 2019/0090133 A1* | 3/2019 | Wang | H04L 63/0876 |
| 2020/0145404 A1* | 5/2020 | Singleton, IV | G06F 21/45 |

* cited by examiner

*Primary Examiner* — Chris Parry
*Assistant Examiner* — Steven C Nguyen
(74) *Attorney, Agent, or Firm* — Thomas Horstemeyer, LLP

(57) ABSTRACT

Disclosed are various approaches for preauthorizing the joining of a client device to a domain managed by a cloud-based directory service. An authorization token can be generated prior to a client device joining the domain. The authorization token can be subsequently installed on a client device at an OEM facility. When a user first logs into the client device, the client device can send the authorization token to the cloud-based directory service in lieu of administrative credentials to prove that the client device has been previously authorized to join the domain.

20 Claims, 5 Drawing Sheets

PREAUTHORIZED DOMAIN JOIN

BACKGROUND

Companies often purchase computing devices (e.g., laptops, desktops, tablets, mobile devices, etc.) from original equipment manufacturers (OEMs), such as DELL, LENOVO, HEWLETT-PACKARD, and similar companies. To minimize the amount of work needed to configure the computing device upon receipt, OEMs often will preconfigure computing devices at the factory or assembly facility on behalf of the customer. For example, prespecified software may be installed and some operating or application settings may be configured. However, certain security settings may not be able to be configured.

For example, the OEM may not be able to configure the computing device to be joined to a domain managed by a directory service (e.g., MICROSOFT ACTIVE DIRECTORY®) used by the customer. This could be because the customer does not wish to provide sensitive administrative credentials to the OEM that would allow the OEM to add a computing device to the customer's domain or directory service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for preauthorizing a client device to join a domain managed by a directory service. One preauthorized, the authorization information can be provided to an OEM for installation on a client device. The client device can then automatically join the domain managed by the directory service when the client device is first used by a user by providing the user's credentials and the authorization information to the directory service.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
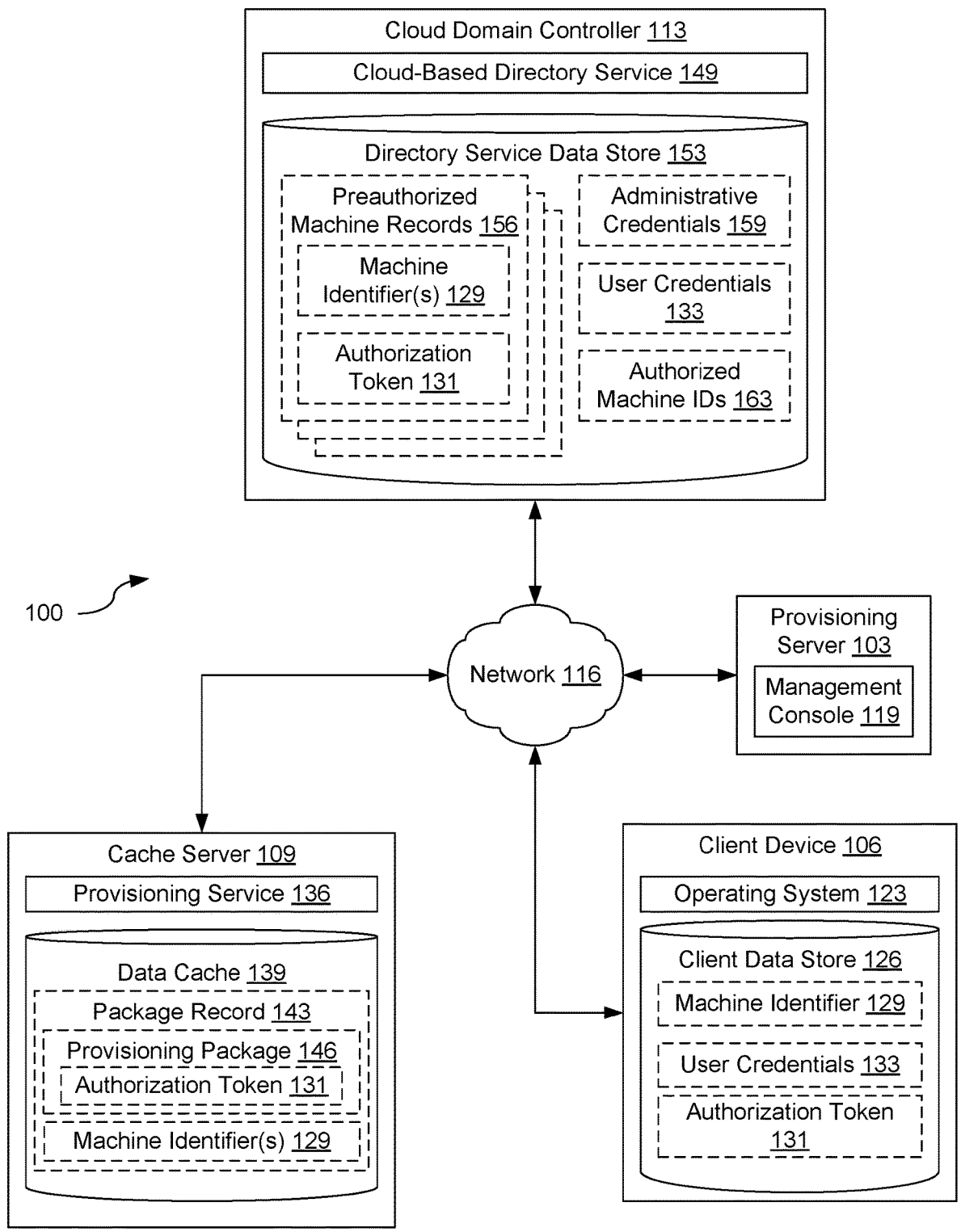
FIG. 1 is a drawing of a network environment according to various embodiments of the present disclosure.

FIG. 1 depicts a network environment 100 according to various embodiments. The network environment 100 can include a provisioning server 103, a client device 106, a cache server 109, and a cloud domain controller 113, which can be in data communication with each other via a network 116.

The network 116 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 116 can also include a combination of two or more networks 116. Examples of networks 116 can include the Internet, intranets, extranets, virtual private networks (VPNs), and similar networks.

The provisioning server 103 can be hosted on a cloud provider network, described later in further detail, or on one or more dedicated computing devices. The provisioning server 103 may be configured to host a management console 119, as well as provide for other administrative services.

The management console 119 can be executed to provide an administrative interface to the provisioning server 103 and/or the cloud-based directory service 149. In some instances, the management console 119 can be implemented as a standalone or independent application. In other instances, the management console 119 can implemented as a web- or network-based application or service (e.g., a website, web portal, or web service).

The client device 106 is representative of a plurality of client devices that can be coupled to the network 116. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a browser, a dedicated application, email applications, social networking applications, word processors, spreadsheets, or other applications. Moreover, the client device 106 may have an operating system 123 installed which can provide for the management of hardware resources by applications installed on the client device 106 and provide various services for applications installed on the client device 106. Accordingly, the operating system 123 can be configured to connect to the cloud domain controller 113 to join a domain hosted or managed by the cloud domain controller 113.

The client device 106 can also host a client data store 126, which is accessible to the operating system 123 and other applications executing on the client device 106. The client data store 126 can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the client data store 126 is associated with the operation of the various applications or functional entities described herein. This data can include the machine identifier 129 for the client device 106, user credentials 133 of a user of the client device 106, and potentially other data.

The machine identifier 129 can represent any identifier of the client device 106 that serves to uniquely identify the client device 106 with respect to other client devices 106. Examples of machine identifiers 129 can include serial numbers, hardware specific identifiers (e.g., media access control (MAC) addresses or international mobile equipment identification (IMEI) numbers), software generated identifiers (e.g., globally unique identifiers (GUIDs) or universally unique identifiers (UUIDs)), or other identifiers created and assigned to the client device 106 (e.g., machine names). In some instances, the machine identifier 129 could be created by the client device 106 itself, while in other instances a machine identifier 129 could be created and assigned to the client device 106. It is possible for a client device 106 to have multiple machine identifiers 129 associated with it.

The authorization token 131 is a token or other unique piece of data assigned to the client device 106 by the cache server 109. The authorization token 131 can be presented to the could domain controller 113 to allow the client device 106 to join a domain managed by the cloud domain controller 113, as discussed in detail later.

The user credentials 133 represent credentials that identify uniquely identify the user of the client device 106 with respect to other potential users of the client device 106 and that authenticate or verify the identity of the user of the client device 106. For example, user credentials 133 could include a username and a password, authentication token (e.g., generated by a multi-factor authentication device or service), biometric information (e.g., fingerprint, iris, or facial recognition), cryptographic certificates, or similarly verifying information. User credentials 133 can either be created by a user, assigned to a user, or be the result of a combination thereof (e.g., a username assigned to a user and authentication credentials selected and supplied by the user).

The cache server 109 can be hosted on one or more computing devices in a facility where client devices 106 are manufactured or assembled and configured. The cache server 109 may host a provisioning service 136 and potentially other applications. The cache server 109 can also host a data cache 139, which is accessible to the provisioning service 136. The data cache 139 can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data cache 139 is associated with the operation of the various applications or functional entities described herein. This data can include package records 143, which can be used to provision, configure, or otherwise customize a client device 106 before it leaves the facility.

The provisioning service 136 can be executed at the facility where the client device 106 is manufacture apply a provisioning package 146 to the client device 106 to configure or customize the client device 106 to the specifications of the company that ordered or commissioned the client device 106. For example, the provisioning service 136 could be executed to identify any package records 143 in the data cache 139 with a machine identifier 129 that matches the machine identifier 129 assigned to a client device 106. The provisioning service 136 could then apply the respective provisioning package 146 in the package record 143 to the client device 106, thereby causing an authorization token 131 to be installed on the client device 106.

The package record 143 represents a mapping or a relationship between a provisioning package 146 generated by the management console 119 and one or more machine identifiers 129 for respective client devices 106. The mapping provided by the package record 143 allows the provisioning service 136 to determine which provisioning packages 146 should be applied to a newly assembled client device 106, as discussed in further detail later.

The provisioning package 146 can represent a collection or archive of configuration files, settings, and/or application installers bundled together in a single file. A provisioning package 146 can also include one or more scripts that can configure a client device 106 based at least in part on the configuration files or settings and/or execute the application installers to install a particular application on a client device 106. For example, a provisioning package 146 could include an authorization token 131 and a script to install the authorization token 131 on a client device 106. One example of a provisioning package 146 is a MICROSOFT Provisioning Package (PPKG).

The cloud domain controller 113 can also be hosted on a cloud provider network to provide directory services to one or more client devices 106 attached to the network 116. Examples of directory services include MICROSOFT ACTIVE DIRECTORY, APPLE OPEN DIRECTORY, RED HAT DIRECTORY SERVICE, OpenLDAP, or other directory services based on the lightweight directory access protocol (LDAP). This could include, for example, a domain managed by the cloud domain controller 113 to track and manage computing devices and user accounts by applying and enforcing settings or verifying the identity of managed users or devices. Various applications or other functionality can be executed cloud provider network by the cloud domain controller 113, such as a cloud-based directory service 149.

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands.

These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Various data can also be stored in a directory service data store 153 that is accessible to the cloud-based directory service 149 executing on the cloud domain controller 113. The directory service data store 153 can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the directory service data store 153 is associated with the operation of the cloud-based directory service 149. This data can include one or more pre-authorized machine records 156, one or more sets of administrative credentials 159, and one or more sets of authorized machine identifiers 163, and potentially other data.

The pre-authorized machine records 156 represent records of one or more client devices 106 that are pre-authorized to join a domain managed by the cloud-based directory service 149. Accordingly, each pre-authorized machine record 156 can include a machine identifier 129 for a client device 106 that has been previously authorized to join the domain and an authorization token 131 that can be used by the client device 106 to prove or otherwise verify its pre-authorization status. In some implementations, a single authorization token 131 may be used for multiple client devices 106 in the interest of efficiency (e.g., where hundreds or thousands of client devices 106 have been pre-authorized). In other implementations, an authorization token 131 may be generated for each client device 106 that is pre-authorized to join a domain.

The administrative credentials 159 are credentials of an administrative user who is permitted to authorize client devices 106 to join a domain managed by the cloud-based directory service 149. For example, administrative credentials 159 could include a username and a password, authentication token (e.g., generated by a multi-factor authentication device or service), biometric information (e.g., fingerprint, iris, or facial recognition), cryptographic certificates, or similarly verifying information. Administrative credentials 159 can either be created by a user, assigned to a user, or be the result of a combination thereof (e.g., a username assigned to a user and authentication credentials selected and supplied by the user).

The authorized machine identifiers 163 represent a list, collection, or other set of machine identifiers 129 of client devices 106 that have joined the domain managed by the cloud-based directory service 149. The authorized machine identifiers 163 can be used by the cloud-based directory service 149 to determine which client devices 106 should or should not be subject to the various policies specified for a domain managed by the cloud-based directory service 149.

Next, a general description of the operation of the various components of the network environment 100 is provided. Although this general description provides a high-level description of other operation of and interaction between the various components of the network environment 100, it is understood that other operations or interactions are also encompassed by the present disclosure. More detailed descriptions of the operation of, and interactions between, individual components is provided in the detailed description of FIGS. 2-5.

To begin, an administrative user interacts with a management console 119 to configure one or more client devices 106 on order from an OEM to be configured to join a domain managed by the cloud-based directory service 149. This may be done, for example, so that a user is automatically joined to the domain managed by the cloud-based directory service 149 when the user first receives and boots the client device 106. Accordingly, the administrative user may specify, using the management console 119, the domain to be joined and the machine identifier(s) 129 of the client device(s) 106 to be configured. The administrative user may also input his or her administrative credentials 159 in order to authorize the configuration.

The management console 119 may then generate a provisioning package 146 that can be used by the OEM to configure the client device 106 at the factory or assembly facility. Accordingly, the management console 119 can send the administrative credentials 159 and machine identifier(s) 129 to the cloud-based directory service 149. Upon verification of the supplied administrative credentials 159, the cloud-based directory service 149 can generate an authorization token 131 for each supplied machine identifier 129 or a single authorization token 131 common to all of the supplied machine identifiers 129. The cloud-based directory service 149 can then provide the authorization token 131 to the provisioning server 103 in response and also create respective preauthorized machine records 156 in parallel. Each preauthorized machine record 156 can include one or more machine identifiers 129 provided by the management console 119 and a respective authorization token 131.

Upon receipt of the authorization token 131, the management console 119 can generate a provisioning package 146 that contains the authorization token 131. The management console 119 can then provide the provisioning package 146 and respective machine identifier(s) 129 to the provisioning service 136 hosted by the cache server 109. The provisioning service 136 can then create and store package record(s) 143 that map the provisioning package 146 to a respective machine identifier(s) 129.

Subsequently, the provisioning service 136 may receive a request for a provisioning package 146 (e.g., as part of a configuration or assembly process for a client device 106). The request may include the machine identifier 129 for the client device 106 being configured. In response, the provisioning service 136 can search the data cache 139 for a package record 143 with a matching machine identifier 129. If such a package record 143 exists, the provisioning package 146 may be applied to the client device 106 itself or provided to the requesting application, which can in turn apply the provisioning package 146, thereby causing the authorization token 131 to be installed on the client device 106.

Subsequently (e.g., at the first boot of the client device 106 by a user), the operating system 123 of the client device 106 may prompt the user for user credentials 133. Once the operating system 123 receives or otherwise obtains the user credentials 133, the operating system 123 can connect to the cloud-based directory service 149 to join a domain. The operating system's 123 request can include the machine identifier 129 and the user credentials 133.

In response, the cloud-based directory service 149 can search the directory service data store 153 to identify a preauthorized machine record 156 that matches the machine identifier 129 provided by the operating system 123. If a preauthorized machine record 156 exists, then the cloud-based directory service 149 can further determine whether the authorization token 131 in the preauthorized machine record 156 matches the authorization token 131 supplied by the operating system 123 of the client device 106. If the authorization tokens 131 match, the cloud-based directory service 149 can determine whether supplied user credentials 133 match the user credentials 133 in the directory service data store 153 for a valid or authorized user. If the user credentials 133 match, then the cloud-based directory service 149 can add the machine identifier 129 to the list of authorized machine identifiers 163. The cloud-based directory service 149 may also send a response to the client device 106 indicating the name of the domain that was joined, a domain-specific machine identifier 129, and potentially other information (e.g., policies or settings to be applied or otherwise enforced).

Figure 2:
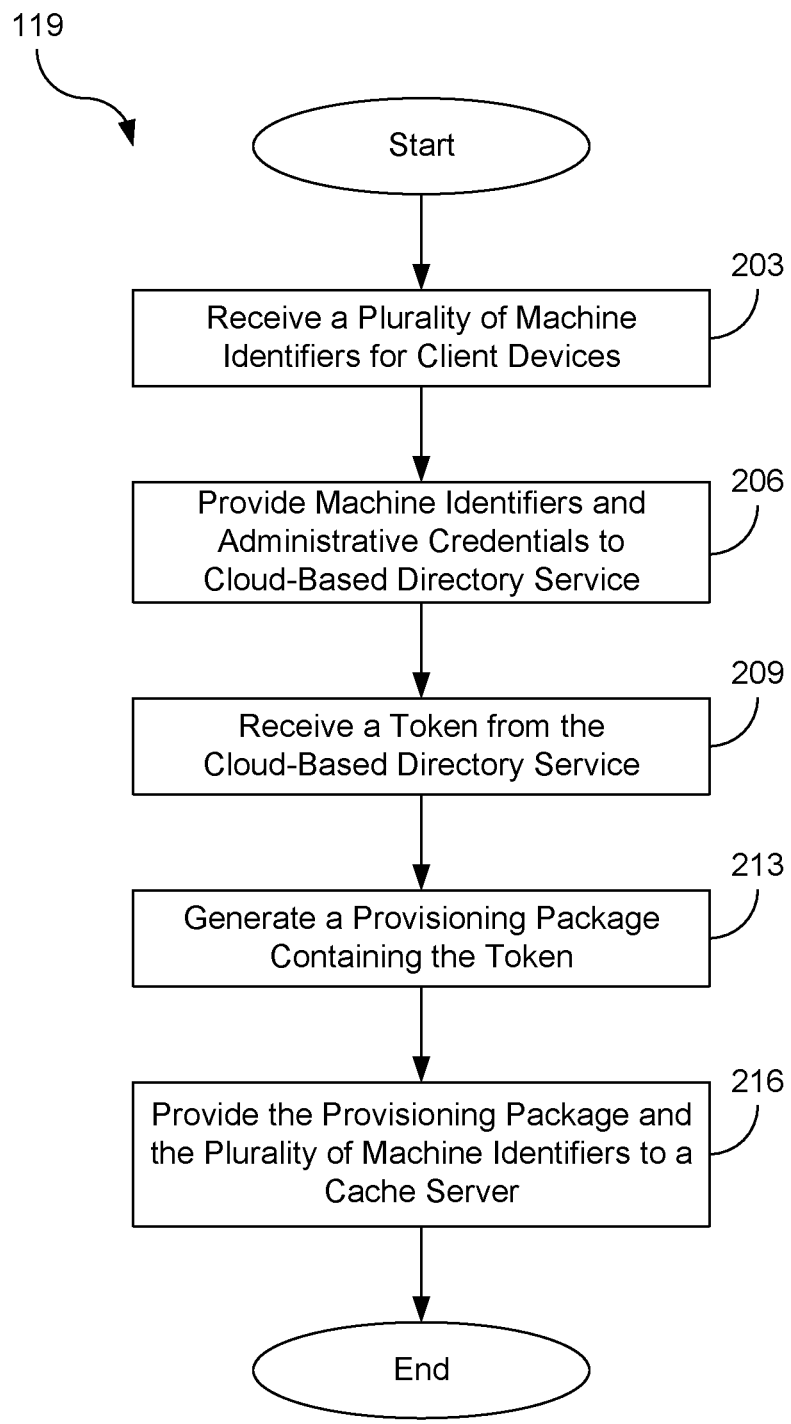
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the management console 119. The flowchart of FIG. 2 provides merely an example of the many different types of functional arrangements that can be employed to implement the operation of the depicted portion of the management console 119. As an alternative, the flowchart of FIG. 2 can be viewed as depicting an example of elements of a method implemented within the network environment 100.

Beginning with block 203, the management console 119 can receive one or more machine identifiers 129 for client devices 106 that will be joined to a domain managed by the cloud-based directory service 149. For example, a file containing a plurality of machine identifiers 129 may be uploaded to the management console 119 through a web-based interface. Similarly, one or more of the machine identifiers 129 may be supplied manually to the management console 119 through a web-based interface.

Next at block 206, the management console 119 can provide the machine identifiers 129 and administrative credentials 159 for an administrator of the domain to the cloud-based directory service 149. The administrative credentials 159 may have been previously supplied by the administrative user (e.g., as part of a login or authentication process with the management console 119) or the management console 119 may prompt the administrative user to submit the administrative credentials 159 at this point in the process.

Then at block 209, the management console 119 can receive one or more authorization tokens 131 from the cloud-based directory service 149. For example, the management console 119 could receive one authorization token 131 that could be used to prove that any client device 106 associated with one of the machine identifiers 129 provided to the cloud-based directory service 149 at block 206 is authorized to join the domain. As another example, the management console 119 could receive a unique authorization token 131 each respective machine identifier 129.

Moving on to block 213, the management console 119 can generate a provisioning package 146 that contains the authorization token 131. Where multiple authorization tokens 131 were received, the management console 119 could create a respective set of provisioning packages 146.

Next at block 216, the management console 119 can then provide the provisioning package(s) 146 and the machine identifier(s) 129 to the provisioning service 136 for storage in the data cache 139. The process then subsequently ends.

Figure 3:
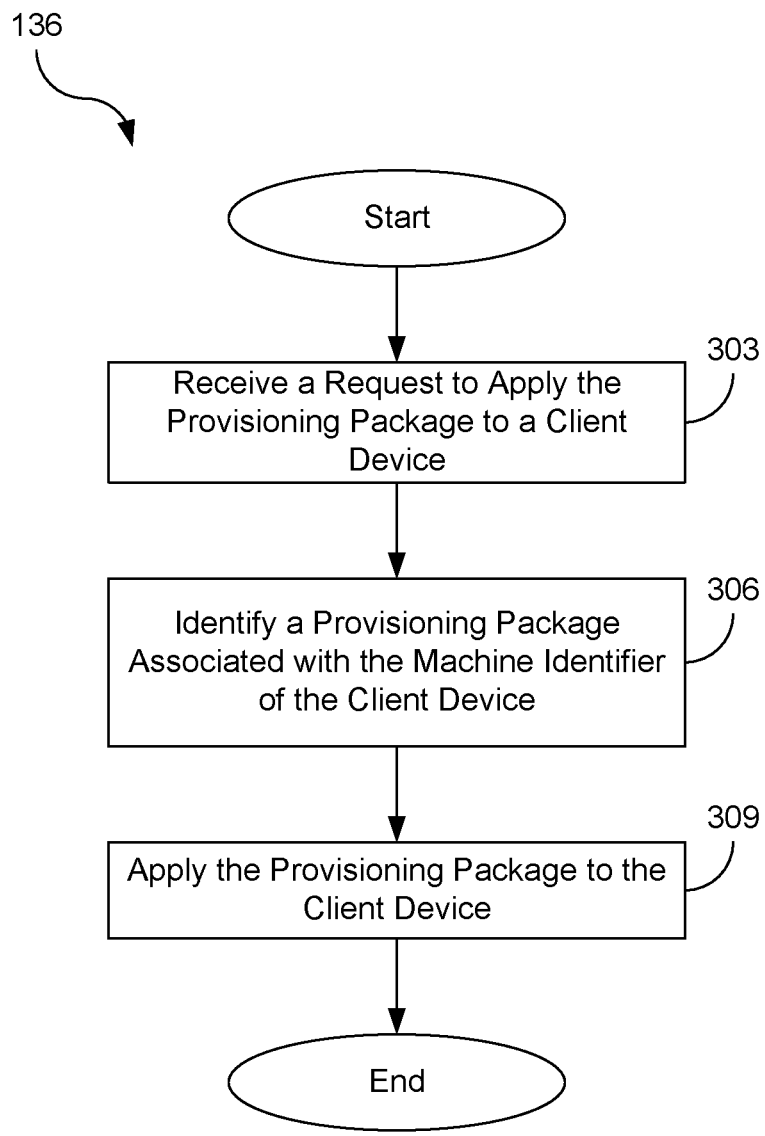
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the provisioning service 136. The flowchart of FIG. 3 provides merely an example of the many different types of functional arrangements that can be employed to implement the operation of the depicted portion of the provisioning service 136. As an alternative, the flowchart of FIG. 3 can be viewed as depicting an example of elements of a method implemented within the network environment 100.

Beginning with block 303, the provisioning service 136 can receive a request to apply a provisioning package 146 to a client device 106 being assembled or configured at the facility associated with the cache server 109. For example, a technician could make a request to the provisioning service 136 to apply any provisioning packages 146 associated with the machine identifier 129 of the machine being configured. Such a request could be made using a web-based tool or a special-purpose configuration application. Accordingly, the request can include the machine identifier 129 of the client device 106 being configured in order to allow the provisioning service 136 to find the appropriate provisioning package(s) 146.

Next at block 306, the provisioning service 136 can identify a provisioning package 146 associated with the machine identifier 129. For example, the provisioning service 136 could search the package records 143 based on the machine identifier 129 and select a package record 143 that includes the machine identifier 129. The respective provisioning package 146 stored in the package record 143 would be the appropriate provisioning package 146 to be used to configure the client device 106.

Then at block 309, the provisioning service 136 can cause the provisioning package 146 to be applied to the client device 106. For example, the provisioning service 136 could send the provisioning package 146 to the client device 106, which the client device 106 could then apply. The process then subsequently ends.

Figure 4:
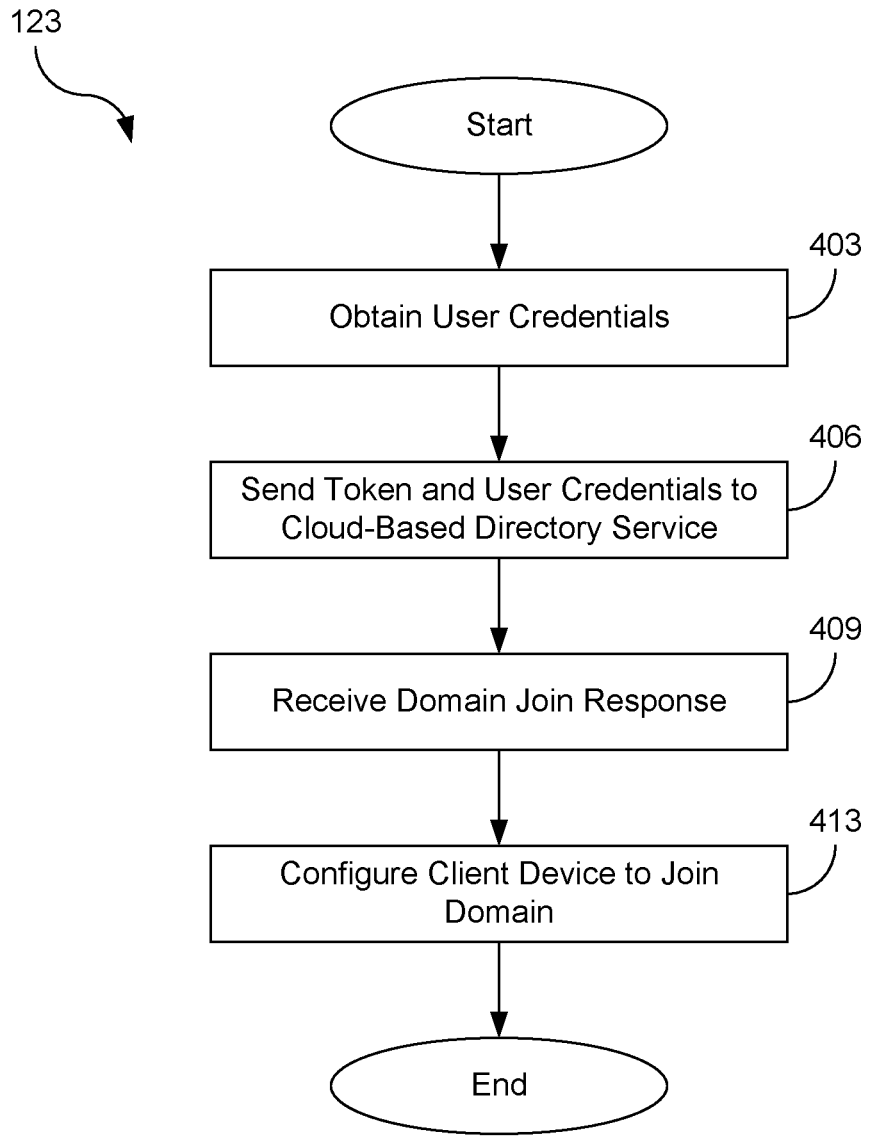
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the operating system 123. The flowchart of FIG. 4 provides merely an example of the many different types of functional arrangements that can be employed to implement the operation of the depicted portion of the operating system 123. As an alternative, the flowchart of FIG. 4 can be viewed as depicting an example of elements of a method implemented within the network environment 100.

Beginning with block 403, the operating system 123 can obtain the user credentials 133 for a user of the client device 106. This could occur, for example when the client device 106 first boots or when the user first logs onto the client device 106 (e.g., when an employee receives a newly purchased laptop from his or her employer). The user credentials 133 could be obtained, for example, through the use of a login screen that prompts the user to input a username, password, and/or other authentication credentials.

Then at block 406, the operating system 123 can send the authorization token 131 previously installed by the provisioning service 136 via the provisioning package 146 to the cloud-based directory service 149 specified in the applied provisioning package 146. The operating system 123 may also include the name of the domain to be joined, as previously provided when the provisioning package 146 was applied to the client device 106.

Next at block 409, the operating system 123 can receive a domain join response from the cloud-based directory service 149. The domain join response can include a unique identifier for the domain (e.g., a security identifier (SID)) and a confirmation that the client device 106 is a member of the domain managed by the cloud-based directory service 149. In some instances, the domain join response can include one or more policies or configuration settings that are to be applied to or enforced on the client device 106 (e.g., user or application permissions or restrictions, etc.).

Proceeding to block 413, the operating system 123 can configure the client device 106 to join the domain. For example, the operating system 123 could set a value for a setting specifying the domain of the client device 106, adjust one or more values of settings to enforce various policies provided by the cloud-based directory service 149, update various system settings or services to use those provided by the cloud-based directory service, etc. After configuring the client device 106 to be a member of the domain, the process can subsequently end.

Figure 5:
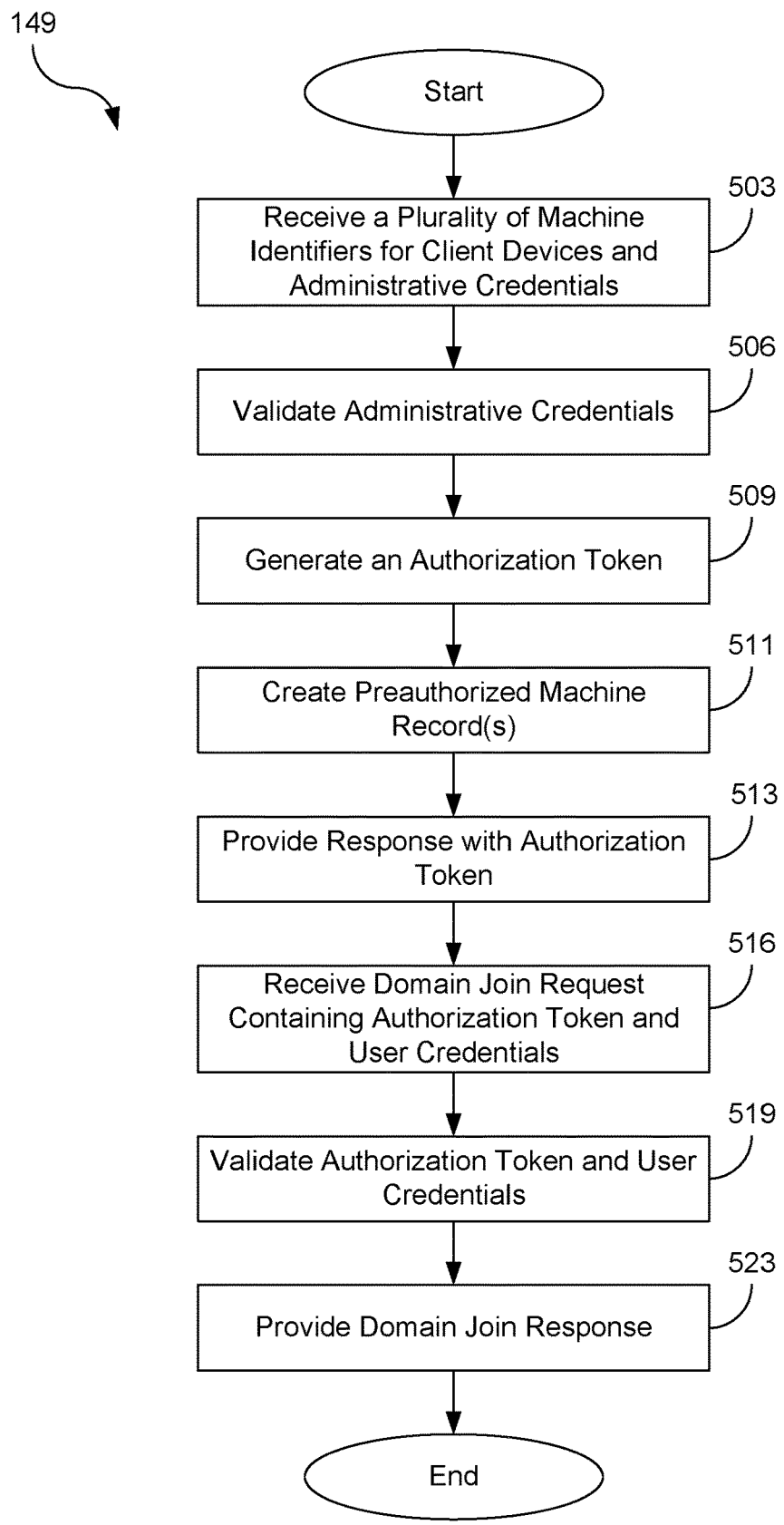
FIG. 5 is a flowchart illustrating one example of functionality implemented as portions of an application executed in a computing environment in the network environment of FIG. 1 according to various embodiments of the present disclosure.

Referring next to FIG. 5, shown is a flowchart that provides one example of the operation of a portion of the cloud-based directory service 149. The flowchart of FIG. 5 provides merely an example of the many different types of functional arrangements that can be employed to implement the operation of the depicted portion of the cloud-based directory service 149. As an alternative, the flowchart of FIG. 5 can be viewed as depicting an example of elements of a method implemented within the network environment 100.

Beginning with block 503, the cloud-based directory service 149 can receive one or more machine identifiers 129 from a management console 119, as well as at least one set of administrative credentials 159 for an administrative user authorized to add client devices 106 to a domain managed by the cloud-based directory service 149. For example, the cloud-based directory service 149 could receive the machine identifier(s) 129 and administrative credentials 159 from an administrative user who is configuring client devices 106 ordered for employees to be automatically joined to the cloud-based directory service 149 when they first login to their client devices 106.

Then at block 506, the cloud-based directory service 149 can validate the received administrative credentials 159. For example, the cloud-based directory service 149 could compare the administrative credentials 159 provided by the management console 119 to those stored in the directory service data store 153 to determine if they match. A match could indicate that the administrative credentials 159 are valid and the user of the management console 119 is authorized to add client devices 106 to the domain.

Next at block 509, the cloud-based directory service 149 can generate an authorization token 131 that can be used by a client device 106 to prove or otherwise assert that it is pre-authorized to join the domain. In some implementations, a unique authorization token 131 may be generated for each machine identifier 129 submitted by the management console 119. In other implementations, a single authorization token 131 may be generated that can be used for any client device 106 identified by one of the submitted machine identifiers 129.

Then at block 511, the cloud-based directory service 149 can create one or more preauthorized machine record(s) 156 for future reference. Each preauthorized machine record 156 can include a copy of the machine identifier 129 for the preauthorized client device 106 and the authorization token 131 generated at 509. Where multiple client devices 106 are associated with a single authorization token 131, then a single preauthorized machine record 156 could be generated that contains multiple machine identifiers 129 and the single, shared authorization token 131. However, individual preauthorized machine records 156 can also be created for each machine identifier 129.

Moving on to block 513, the cloud-based directory service 149 can provide a response to the management console 119 that includes the authorization token(s) 131 generated for the machine identifier(s) 129. The response can also include the name or network address (e.g., internet protocol address or fully-qualified domain name) of the cloud-based directory service 149. In other implementations, however, this information may already be known by or available to the management console 119, in which case it may be excluded from the response.

Later, at block 516, the cloud-based directory service 149 can receive a request to join the domain from a client device 106. The request can include the authorization token 131, a machine identifier 129 for the client device 106, and user credentials 133 for a user of the client device 106.

Next at block 519, the cloud-based directory service 149 can validate the authorization token 131 and the user credentials 133. For example, the cloud-based directory service 149 could search for a previously created preauthorized machine record 156 for the supplied machine-identifier. If one exists, the cloud-based directory service 149 could then determine whether the received authorization token 131 matches the authorization token 131 stored in the identified preauthorized machine record 156. In addition, the cloud-based directory service 149 could determine whether the supplied user credentials 133 match the user credentials 133 for a valid user stored in the directory service data store 153. Assuming that the authorization token 131 stored in the preauthorized machine record 156 matches the supplied authorization token 131 and the user credentials 133 are valid, then the cloud-based directory service 149 can conclude that the client device 106 has already been authorized to join the domain.

Then at block 523, the cloud-based directory service 149 can provide a domain join response to the client device 106. For example, the cloud-based directory service 149 could include in the domain join response a unique identifier for the domain (e.g., a security identifier (SID)) and a confirmation that the client device 106 is a member of the domain managed by the cloud-based directory service 149. In some instances, the domain join response can include one or more policies or configuration settings that are to be applied to or enforced on the client device 106 (e.g., user or application permissions or restrictions, etc.).

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

We claim:

1. A system, comprising:
   a computing device comprising a first processor and a first memory;

a cache server comprising a second processor and a second memory;
a first set of machine-readable instructions stored in the first memory that, when executed by the first processor, cause the computing device to at least:
provide a first machine-identifier and administrative credentials to a cloud-based directory service, the first machine-identifier uniquely identifying a client device from among a plurality of computing devices;
receive a token from the cloud-based directory service in response to providing the first machine-identifier to the cloud-based directory service, wherein the token is unique to the first machine-identifier;
generate a package file comprising the token and a second set of machine-readable instructions configured to install the token, the package file being associated with the first machine-identifier; and
provide the package file to the cache server in network communication with the computing device, wherein the package file is stored on the cache server in association with the first machine-identifier; and
a third set of machine-readable instructions stored in the second memory that, when executed by the second processor, cause the cache server to at least:
receive a request to apply the package file to the client device, the request comprising a second machine-identifier;
identify the package file by comparing the first machine-identifier associated with the package file to the second machine-identifier; and
apply the package file to the client device in response to a confirmation that the first machine-identifier matches the second machine-identifier.

2. The system of claim 1, wherein
the third set of machine-readable instructions that apply the package file to the client device send a request to the client device to execute the second set of machine-readable instructions, which causes the token to be stored on the client device.

3. The system of claim 1, wherein the client device comprises a third processor, a third memory, and a fourth set of machine-readable instructions that, when executed, cause the client device to at least:
obtain user credentials from a user of the client device; and
send a request to the cloud-based directory service to join a domain managed by the cloud-based directory service, the request comprising the user credentials and the token.

4. The system of claim 3, wherein the client device sends the request to the cloud-based directory service to join the domain in response to a first login by the user.

5. The system of claim 1, wherein the first set of machine-readable instructions further cause the computing device to include in the package a name of a domain that the token authorizes the client device to join when the token is presented to the cloud-based directory service.

6. The system of claim 1, wherein the package file is a provisioning package file.

7. The system of claim 1, wherein the cloud-based directory service implements at least a version of a lightweight directory access protocol (LDAP).

8. A method, comprising:
providing, by a computing device, a first machine-identifier to a cloud-based directory service, the first machine-identifier uniquely identifying a client device from among a plurality of computing devices;
receiving, by the computing device, a token from the cloud-based directory service in response to providing the first machine-identifier to the cloud-based directory service, wherein the token is unique to the first machine-identifier;
generating, by the computing device, a package file comprising the token and machine-readable instructions configured to install the token, the package file being associated with the first machine-identifier;
providing, by the computing device, the package file to a cache server in network communication with the computing device, wherein the package file is stored on the cache server in association with the first machine-identifier;
receiving, by the cache server, a request to apply the package file to the client device, the request comprising a second machine-identifier;
identifying, by the cache server, the package file by comparing the first machine-identifier associated with the package file to the second machine-identifier; and
applying, by the cache server, the package file to the client device in response to a confirmation that the first machine-identifier matches second machine-identifier.

9. The method of claim 8, wherein
applying the package file to the client device causes the machine-readable instructions to be executed by the client device which further causes the token to be stored on the client device.

10. The method of claim 8, further comprising:
obtaining, by the client device, user credentials from a user of the client device; and
sending, by the client device, a request to the cloud-based directory service to join a domain managed by the cloud-based directory service, the request comprising the user credentials and the token.

11. The method of claim 8, further comprising including in the package a name of a domain that the token authorizes the client device to join when the token is presented to the cloud-based directory service.

12. The method of claim 10, wherein the client device sends the request to the cloud-based directory service to join the domain in response to a first login by the user.

13. The method of claim 8, wherein the package file is a provisioning package file.

14. The method of claim 8, wherein the cloud-based directory service implements at least a version of a lightweight directory access protocol (LDAP).

15. A plurality of non-transitory, computer-readable media comprising:
a first non-transitory, computer-readable medium that comprises a first set of machine-readable instructions that, when executed by a first processor of a computing device, cause the computing device to at least:
provide a first machine-identifier and administrative credentials to a cloud-based directory service, the first machine-identifier uniquely identifying a client device from among a plurality of computing devices;
receive a token from the cloud-based directory service in response to providing the first machine-identifier to the cloud-based directory service, wherein the token is unique to the first machine-identifier;
generate a package file comprising the token and a second set of machine-readable instructions configured to install the token, the package file being associated with the first machine-identifier; and provide the package file to a cache server in network communication with the computing device, wherein the package file is stored on the cache server in association with the first machine-identifier; and a second non-transitory, computer-readable medium that comprises a third set of machine-readable instructions that, when executed by a second processor of the cache server, cause the cache server to at least:

receive a request to apply the package file to the client device, the request comprising a second machine-identifier;

identify the package file by comparing the first machine-identifier associated with the package file to the second machine-identifier; and apply the package file to the client device in response to a confirmation that the first machine-identifier matches the second machine-identifier.

16. The plurality of non-transitory, computer-readable media of claim 15, wherein the first set of machine-readable instructions further cause the computing device to include in the package file a name of a domain that the token authorizes the client device to join when the token is presented to the cloud-based directory service.

17. The plurality of non-transitory, computer-readable media of claim 15, wherein application of the package file to the client device by the cache server causes the second set of machine-readable instructions to be executed by the client device which further causes the token to be stored on the client device.

18. The plurality of non-transitory, computer-readable media of claim 15, wherein the token, when presented by the client device to the cloud-based directory service in conjunction with user credentials obtained by the client device, represents to the cloud-based directory service that the client device is authorized to join a domain managed by the cloud-based directory service.

19. The plurality of non-transitory, computer-readable media of claim 15, wherein the package file is a provisioning package file.

20. The plurality of non-transitory, computer-readable media of claim 15, wherein the cloud-based directory service implements at least a version of a lightweight directory access protocol (LDAP).

* * * * *